United States Patent
Pham et al.

(10) Patent No.: US 11,200,343 B2
(45) Date of Patent: *Dec. 14, 2021

(54) SWAPPABLE DOUBLE LAYER BARCODE

(71) Applicant: Capital One Services, LLC, McLean, VA (US)

(72) Inventors: Vincent Pham, Champaign, IL (US); Austin Grant Walters, Savoy, IL (US); Jeremy Edward Goodsitt, Champaign, IL (US); Fardin Abdi Taghi Abad, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/950,506

(22) Filed: Nov. 17, 2020

(65) Prior Publication Data
US 2021/0150043 A1 May 20, 2021

Related U.S. Application Data

(63) Continuation of application No. 16/688,572, filed on Nov. 19, 2019, now Pat. No. 10,846,436.

(51) Int. Cl.
*G06K 7/10* (2006.01)
*G06K 19/06* (2006.01)
*G06F 21/62* (2013.01)

(52) U.S. Cl.
CPC ..... *G06F 21/629* (2013.01); *G06K 19/06037* (2013.01)

(58) Field of Classification Search
CPC ...... G06F 21/64; G06F 21/6209; G06F 21/62; G06F 21/629; G06K 19/06037; G06K 7/1417
USPC .................... 235/462.01, 462.08–462.1, 494
See application file for complete search history.

(56) References Cited

U.S. PATENT DOCUMENTS

| | | | |
|---|---|---|---|
| 9,984,366 B1 * | 5/2018 | Jammikunta | G09C 5/00 |
| 10,559,964 B2 * | 2/2020 | Kim | H02J 7/0027 |
| 2014/0340723 A1 * | 11/2014 | Matsubara | B42D 25/425 359/2 |
| 2016/0027042 A1 * | 1/2016 | Heeter | G06Q 30/0248 705/14.47 |
| 2016/0292428 A1 * | 10/2016 | Brady | G06F 21/10 |

* cited by examiner

*Primary Examiner* — Tuyen K Vo
(74) *Attorney, Agent, or Firm* — Kacvinsky Daisak Bluni PLLC

(57) ABSTRACT

Techniques to enhance the security of matrix codes. An aggregated matrix code may be scanned to obtain a certain level of access with respect to at least one feature of an application executed on a computer device. The aggregated matrix code may include a user-specific matrix code uniquely assignable to at least one user of a group of users and a base matrix code associated with the group of users.

20 Claims, 5 Drawing Sheets

SWAPPABLE DOUBLE LAYER BARCODE

CROSS-REFERENCE TO RELATED APPLICATIONS

This application is a continuation of U.S. patent application Ser. No. 16/688,572, entitled "SWAPPABLE DOUBLE LAYER BARCODE" filed on Nov. 19, 2019. The contents of the aforementioned application are incorporated herein by reference in their entirety.

BACKGROUND

The present embodiments relate to increasing the security and versatility associated with matrix codes, and more particularly with multilayered barcodes.

Scannable matrix codes, e.g. barcodes, are used as a medium to access information, process transactions, and/or facilitate electronic operations. Conventional barcodes lack versatility in multipurpose applications and large enterprise solutions.

Accordingly, there is a need to improve the generation and use of scannable matrix codes, e.g. barcodes.

SUMMARY

One aspect of the present disclosure includes a computer implemented method utilizing matrix codes, e.g. scannable barcodes. The method can include: scanning an aggregated matrix code to obtain a certain level of access with respect to at least one feature of an application executed on a computer device, where the aggregated matrix code includes a user-specific matrix code uniquely assignable to at least one user of a group of users and a base matrix code associated with the group of users.

Another aspect of the present disclosure includes an apparatus configured to generate and/or utilize a matrix code, e.g. barcode. The apparatus can include: a processor circuit, and a memory storing instructions which when executed by the processor circuit, cause the processor circuit to: access, by an application associated with a computer device, a user-specific matrix code uniquely assignable to at least one user of a group of users, and create an aggregated matrix code by overlaying, by the application associated with the computer device, the user-specific barcode to a base matrix code associated with the group of users.

Yet another aspect of the present disclosure includes an article of manufacture and/or device for utilizing a matrix code, e.g. barcode. The device can include: a display, and circuitry coupled with the display, the circuitry configured to cause the display to display an aggregated matrix code, where the aggregated matrix code includes a user-specific matrix code uniquely assignable to at least one user of a group of users and a base matrix code associated with the group of users.

DETAILED DESCRIPTION

Figure 1:
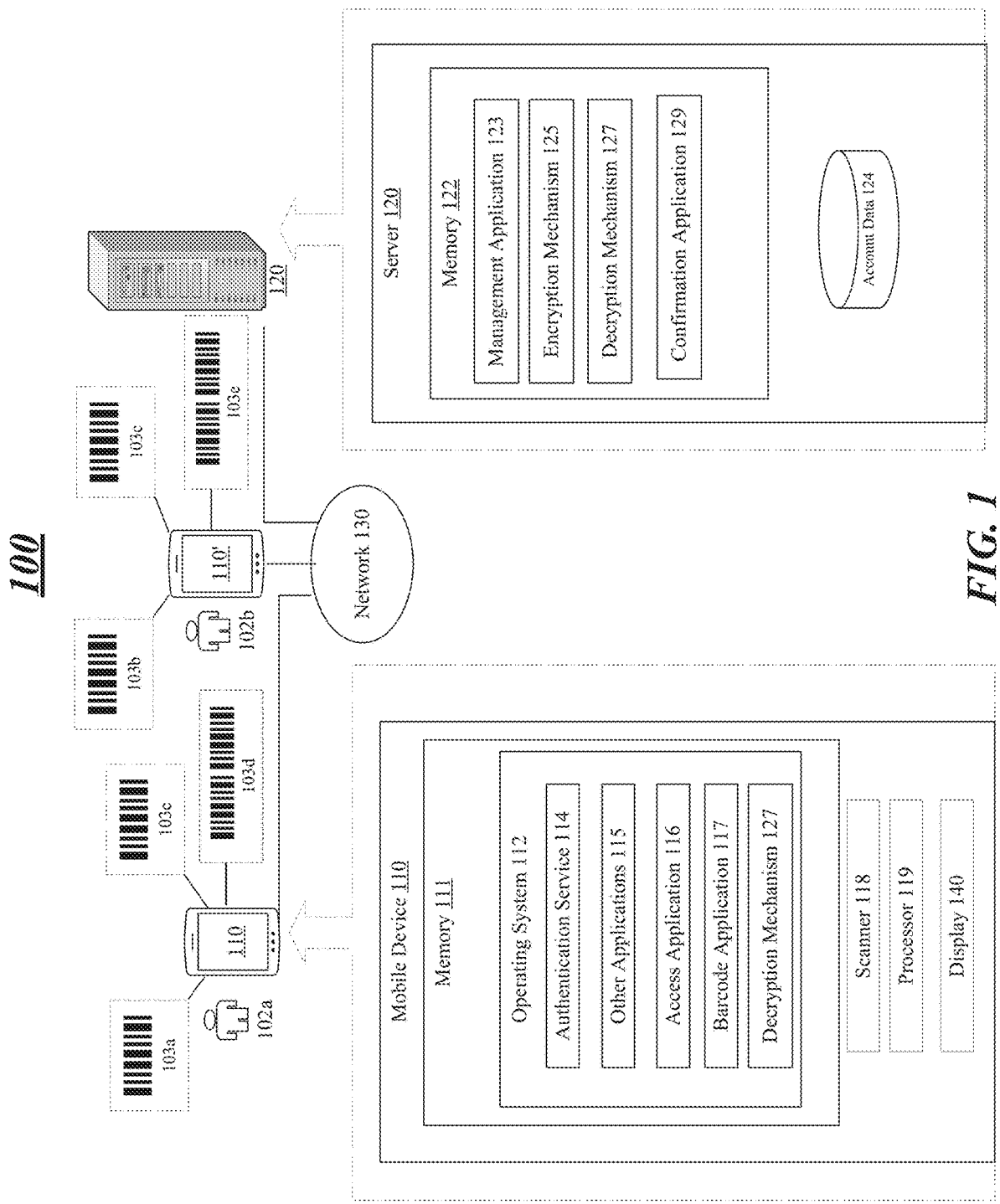
FIG. 1 illustrates an example of a system for generating, transmitting, scanning, and/or utilizing a matrix code, e.g. barcode, in accordance with at least one embodiment of the present disclosure.

Various embodiments are generally directed to techniques, systems, and processing flows to generate, transmit, scan, and or utilize an aggregated matrix code, e.g. such as an aggregated barcode. In various embodiments, the aggregated matrix code can have one or more swappable components, e.g. one matrix code corresponding to a group and one matrix code corresponding to an individual, e.g. a user-specific barcode that can be overlaid on a group or base barcode, where the user-specific matrix code, e.g. barcode, can grant access to one or more features of an application, network, and/or device and where the aggregated matrix code, e.g. barcode, can grant access to even more features of an application, network, and/or device. In various embodiments, either matrix code, e.g. barcode, is swappable, which means that, in addition to enhancing the security of accessing one or more features of a device or network, the versatility and flexibility of accessing applications is increased, as an individual may utilize his or her individual matrix code, e.g. barcode, with multiple group or base matrix codes, e.g. barcodes, and vice-versa, where the aggregated variations offer access to different features with respect to one or more applications, devices, and/or networks.

Reference is now made to the drawings, wherein like reference numerals are used to refer to like elements. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modifications, equivalents, and alternatives within the scope of the claims.

FIG. 1 depicts a schematic of an exemplary system 100, consistent with disclosed embodiments. As shown, the system 100 includes one or more mobile devices 110 and/or 110' that can interact with a user 102a and/or user 102b, respectively, and a server 120 via any suitable network 130 (e.g. internet, intranet, or any other suitable network). The mobile devices 110 are representative of any type of network-enabled computing devices, such as smartphones, tablet computers, wearable devices, laptops, portable gaming devices, and the like. The server 120 is representative of any type of computing device, such as a server, workstation, computer cluster, cloud computing platform, virtualized computing system, and the like. It is noted that the applications, components, and/or features of 110 and 110', as shown and pursuant to various embodiments, can be substantially identical, and for convenience, the description of device 110 is applicable to 110'; however, it is noted that variations are possible according to other embodiments, etc.

As shown, a memory 111 of the mobile device 110 includes an instance of an operating system (OS) 112 and a processor 119 may execute one or more operations associated with the applications of the operating system (OS) 112 and/or perform any other suitable operation associated with processor activity, including comparison operations and executing instructions associated with memory 111. Example operating systems 112 include the Android® OS, iOS®, Linux®, and Windows® operating systems. As shown, the OS 112 includes one or more applications, including an authentication or verification application or service 114 (hereinafter referred to as "authentication application" for convenience), one or more other applications 115, one or more access applications 116, a barcode application 117, and a decryption mechanism 127.

The authentication application 114 is generally configured to perform one or more operations related to authenticating a user 102, including but not limited to determining when a user requires authentication for a transaction, service, or accessibility request, including the accessibility of information associated with credentials from one or more applications of and/or related to a host device, e.g. server 120 and related to authenticating a user 102a and/or 102b with respect to one or more applications hosted by the server and accessible by the users 102a and/or 102b, e.g. access application 116 and/or other applications 115. For example, the authentication application 114 may receive any suitable decryption mechanism 127 from a management application 123 of the server 120, where the decryption mechanism 127 can be related to an encryption mechanism 125 and can facilitate a decryption operation associated with the encryption operation of the encryption mechanism, e.g. such as a token for decrypting a barcode in association with a scan thereof and/or a key to decipher ciphered text.

In various embodiments, the encryption mechanism 125 can be embodied in the form of one or more matrix codes, e.g. barcodes 103a, 103b, 103c, and/or 103d, and the authentication application 114 can receive a single, multiple, or continuous stream of decryption mechanisms 127 from the server 120 in order to decrypt the encryption associated with the encryption mechanism, e.g. the authentication application 114 can utilize a decryption token in relation with a scan of one or more matrix codes, e.g. barcodes 103a, 103b, and/or 103c associated with a scan (e.g. facilitated by a barcode application 117 instructing a scanner 118 to scan a suitable matrix code, e.g. barcode) of the same and/or a static or alternating cipher associated ciphered text. Once the authentication application 114 decrypts the encryption mechanism 125 (e.g. after scanning the one or more barcodes), then access to one or more features associated with access application 116 and/or other applications 115 can occur, e.g. in various embodiments, once decrypted, one or more features of any one of or more of access application 116 and/or other applications 115 can become available to the one or more users 102a, 102b.

In various embodiments, the management application 123 of the server can transmit an encryption scheme, e.g. the encryption mechanism 125 is configured and transmitted accordingly, where the matrix codes, e.g. barcodes, 103a and 103b are user-specific matrix codes, e.g. barcodes, to users 102a and 102b, respectively, and where the matrix code, e.g. barcode 103c, is a base or group barcode 103c that is common to both users 102a and/or 102b as a result of being part of the same group, which can be combined with the individual matrix codes, e.g. barcodes 103a and/or 103b, to form an aggregated matrix code, e.g. barcode 103d for user 102a and barcode 103e for user 102b. In various embodiments, as stated and implied above, the management application 123 can transmit the decryption mechanism 127 that, upon scanning the one or more codes 103a, 103b, 103c, 103d, and/or 103e, one or more features of access application 116 and/or other applications 115 are accessed. In various embodiments, the authentication application 114 can access or utilize the transmitted encryption mechanism 125 to generate any one of the one or more codes 103a, 103b, 103c, 103d, and/or 103e, including forming an aggregated barcode 103d and/or 103e by instructing the barcode generator 117 to do the same. In various embodiments, the authentication application 114 can instruct the barcode generator 117 to utilize the transmitted encryption mechanism 125 to create a unique, individual barcode, for each user 102a and/or 102b, where the individual barcodes, e.g. 103a and/or 103b, are uniquely assignable and unique to the particular individual, e.g. 103a for user 102 and 103b for user 102b. Thereafter, in various embodiments, (as discussed in greater detail below), one or more aggregated barcodes 103d and/or 103e can be created utilizing a common base or group code 103c.

In various embodiments, the management application 123 can transmit the encryption mechanism 125 to one or more devices to generate the one or more barcodes 103a, 103b, 103c, 103d, and/or 103e. In various embodiments, the authentication application 114 of the mobile device, and/or any other suitable application of another device that generates one or more barcodes that can be used in an aggregated scheme as outlined herein, utilizes the encryption mechanism 125 to instruct the barcode generator 117 to generate one or more barcodes and/or generated an aggregated scheme or barcode. In various embodiments, the generation of the aggregated barcode 103d and/or 103e can be at the bit-level, e.g. the encryption mechanism 125 of the server 120 is configured by the management application 123 to be able to generate a first set of encrypted bits for an individual matrix code, (and the authentication application 114 of the mobile device 110 utilizes the scheme to provide appropriate instructions to the barcode generation application 117), where the bits are specific to the user, e.g. barcode 103a specific to user 102a, and a second set of encrypted bits for the group code 103c that are common for a group, e.g. user 102a and user 102b, and where the authentication application 114 can instruct the barcode application 117 to generate the user-specific barcode, e.g. 103a and/or the group and/or base barcode 103c by utilizing the first and/or second bits, as needed, and where an aggregated matrix code, e.g. barcode 103d and/or 103e, is required, combine the first and second bits to form the aggregated code or codes 103d and/or 103e.

In various embodiments, the aggregating of an individual matrix code and a base code to form an aggregated code can be done by actually overlaying generated barcodes on top of one another. In various embodiments, the management application 123 can configure one or more encryption mechanisms 125 to be transmitted such that a first matrix code, e.g. either an individual code, e.g. individual code 103a and/or 103b, and/or a base code 103c is generated, e.g. by the authentication application 114 instructing the barcode application 117 to do so. The generated barcode can be displayed on the display 140, where authentication application 114 of the mobile device and/or the management application 123 of the server, as part of the barcode generation process with respect to the barcode application 117, configures or angles the displayed barcode so that a second barcode (or more) barcode, e.g. the one of the base or individual barcode not initially generated on the display, being overlay-able on the displayed barcode, thus forming an aggregated barcode.

For simplicity, the above discussion, assumes that the mobile device 110 generating the device will contain or be attached to or otherwise associated with the components for receiving the encryption associated with the matrix codes, e.g. barcodes, the components necessary to generate the barcodes, display the barcodes and scan the barcodes. However, in various embodiments, one or more components can be associated with another devices, including a device that independently scans the barcodes and/or independently generates one or more of the user-specific barcodes, the base or group barcodes, and/or the aggregated barcodes. In various embodiments, for example, the mobile device 110 can receive the encrypted mechanism for the individual barcode associated with a user, e.g. user 102a, and generate and display the user specific barcode, e.g. 103a, and another device (not shown) can generate and display the common or base barcode (e.g. by receiving the relevant encryption mechanism from the server 120, and the individual barcode from each user can be overlaid by projection or any other suitable technique, such that a scan of the aggregated barcode associated with the overlaying (by yet another distinct device, e.g. distinct scanner) or by a component of either one of the mobile device and the device associated with the base or group code). In various embodiments, as stated and implied above, the overlaying of the barcodes, with or without requiring a subsequent scan, can grant access to one or more features associated with access application 116 and/or other applications 115. In various embodiments, the encryption mechanism, e.g. 125, can be automatically configured to result in decryption when two barcodes are overlaid over one another, e.g. a base code 103c and an individual code 103a, by defining the key of encryption as the orientation and/or angular relationship between the one or more codes, which in turn results in the access to one or more (e.g. a first and/or second and/or third, etc.) feature associated with access application 116 and/or other applications 115. In various embodiments, this can be advantageous in offering a setting where multiple users, e.g. a conference room, can enter and overlay their individual code on top of the base code to access individual specific information and information common to the group. It should be noted that although various embodiments as discussed herein refer to access application 116 and/or other applications 115, the access granted with respect to the decryption, e.g. scanning and/or overlaying, of barcodes as described herein can be configured to grant access to other applications, whether with respect to mobile device 110 and/or 110' and/or whether hosted by server 120, devices, networks, and/or features as may be suitable.

In various embodiments, the user-specific matrix codes, e.g. barcodes 103a and 103b, can grant access (e.g. once scanned and decrypted) to a first feature or first set of distinct features with respect to access application 116 and/or other applications 115 for each user, e.g. account information that is unique to each user 102a and/or 102b in the account data 124. In various embodiments, the base or group matrix codes, e.g. barcodes 103c, can also grant access to one or more features with respect to access application 116 and/or other applications 115, e.g. where those features are common and the same for a particular group, where the group can include user 102a and/or user 102b. In various embodiments, the combination of matrix codes, e.g. barcodes 103a and 103c to form barcode 103d for user 102a and barcode 103b and 103c to form barcode 103e for user 102b, e.g. aggregated barcode 103d and aggregated barcode 103e, respectively, grants each user additional features that can be unique to that individual with respect to access application 116 and/or other applications 115, e.g. based on the user's role in the group (e.g. manager, full-time employee, contractor, etc.). In various embodiments, the individual matrix code, e.g. barcode e.g. 103a and/or 103b, can grant access to various aspects of access application 116 and/or other applications 115, but the base code 103c by itself cannot, where the individual matrix code, e.g. barcode 103a and/or 103b, provides access to information that is unique to the user for which the matrix code, e.g. barcode 103a and/or 103b, is assigned, e.g. account information that is user specific, and where the combination of the individual matrix codes, e.g. 103a and/or 103b, with the group or base matrix codes 103c grants additional features with respect to the access application 116 and/or other applications 115.

In various embodiments, the individual matrix codes, e.g. 103a and/or 103b, cannot grant access to any features with respect to other applications 115 and/or access application, where the group or base code 103c can grant access to the same features of the one more other applications 115 and/or access application 116, e.g. a set of group tasks that a set of employees, e.g. 102a and/or 102b, of an entity associated with server 120 part of the same team are to perform, and where aggregating the user specific codes 103a and/or 103b with 103c to form aggregated codes 103d and/or 103e grants access to tasks that are specific to a particular employee part of the group, e.g. 102a and/or 102b. In various embodiments, only the aggregated matrix codes, e.g. barcodes 103d and/or 103e, can grant access to one or more features of other applications 115 and/or access application 116.

In various embodiments, where the encryption/decryption scheme is a barcode, the authentication application 114 can instruct the barcode application 117 to facilitate the scanner 118 for scanning the one or more barcodes 103a, 103b, 103c, 103d, and/or 103e. In various embodiments, upon scanning, the authentication application 114 can fetch the decryption mechanism 127 provided by the server 120, and if the decryption mechanism 127 is suitable in relation to the one or more barcodes, including instances involving the scan of the aggregated codes, e.g. barcode 103d and/or 1033, then one or more features associated with the other applications 115 and/or access application 116 can be accessed. In various embodiments, the decryption mechanism can contain the relevant decryption technique to decrypt either the one or both of the base codes and/or the user-specific codes, in addition to being able to decrypt an aggregated code, e.g. whether generated by an overlaying and/or by bit combinations and/or concatenations. In various embodiments, as stated and implied, the scanner 118 (and the associated decryption mechanism can be provided by the server directly thereto) can be independent of the mobile device and/or more than one device (and/or a different type of device than the mobile device). As stated, and implied above, in various embodiments, the codes 103a, 103b, 103c, 103d, and/or 103e can be any suitable matrix code, including but not limited to barcodes.

In various embodiments, the authentication application 114 can send a confirmation back to the server 120 indicating that the one or more barcodes have by the user 102, e.g. once the decryption of an aggregated barcode takes place, the confirmation is sent.

In various embodiments, as shown and as alluded to above, the system 100 can include a host device, such as a server 120, that can be used in accordance with at least one embodiment of the present disclosure. The server 120 can include a memory 122 configurable to include and/or including one or more relevant applications and/or mechanisms for performing one or more operations as outlined in the present disclosure, including a management application 123, which as described above, can communicate directly or indirectly with a user device, e.g. mobile device 110 and/or mobile device 110', and/or any other suitable device that can generate, utilize, scan and/or transmit barcodes, including a device that can be used with another device to generate an overlaid aggregated code, and provide instructions in relation to and mechanisms enabling the decryption of an encryption mechanism 125 with respect to one or more barcodes.

In various embodiments, as implied and stated above, the one or more individual barcodes and/or the group code can be swappable, and any suitable dynamic encryption or decryption can be used to continuously update the encryption associated with generated scannable barcodes. For example, the management application 123 can revoke the token associated with encryption 125 and/or decryption 127 and in relation to the one or more individual barcodes 103*a* and/or 103*b* and/or the group or base code 103*c*. For example, if an individual changes roles within a group, e.g. from a programming role to an administrative role, the token associated with his or her individual barcode can be revoked, while preserving the token that allows the device associated with him or her to generate, scan, and/or combine the base barcode 103*c*. By way of another example, if the individual switches groups in the organization, but the individual's overall role in the organization as a whole remains the same, his or her access to the group barcode 103*c* can be revoked (e.g. the token associated therewith is revoked), while his or her individual barcode, e.g. 103*a*, remains intact. In various embodiments, whether a group or individual barcode is revoked, the other, un-revoked barcode, can remain intact. In various embodiments, there can be more than one group barcode, which is distinct from other group barcodes, but it can be configured (e.g. the encryption and/or decryption scheme associated therewith) to work with individual and/or user-specific barcodes that work with other group or base codes and vice-versa with respect to the individual and/or user-specific codes.

In various embodiments, the revocation of a base or group code 103*c*, can be followed with an updated version of that base matrix code, e.g. barcode, where the updated version can be an entirely new base code for any entirely new group and/or it can be updated in the sense that additional features with respect to the existing group are granted. For example, a group of programmers responsible for task "A" can be subsequently required to also perform task "B," in which case, the management application 123 can revoke the token associated with the original encryption of the base code, issue a new token that grants access to a first set of features (e.g. with respect to access application 116 and/or other applications 115) that corresponded to the original base code, but additionally, to a new set or second set of features that correspond to the additional tasks. In various embodiments, the updating can be an entirely different scheme, e.g. task "A" is abandoned, and task "B" replaces it, in this case, the updating by the management application 123 can be an entirely different token in relation to the encryption scheme. In various embodiments, whichever scheme can apply, the individual codes, e.g. 103*a* and/or 103*b*, can remain unchanged and can continue to work without further updating, e.g. the updated base code 103*c* is changed without requiring a change to the individual codes 103*a* and/or 103*b*. In various embodiments, the reverse can take place when appropriate, e.g. the individual codes are updated, and the base can remain the same.

In various embodiments, after the updating, a new aggregated code can be formed by the authentication application 114 and/or any other suitable application, where the new aggregated code can be by overlaying of a user-specific barcode thereon, or any other suitable scheme as described herein (e.g. scanning), and where the individual barcodes remain versatile and distinct, e.g. a user 102*a* can use his individual barcode 103*a* and a user 102*b* can use his individual barcode 103*b* with the same updated base or group code, e.g. each individual code is still assignable to the associated respective user and can be distinct from the individual codes associated with other users' codes. (Alternatively, the base can remain the same and the user codes can be updated, where the updated individual codes can be configured to be aggregate-able with the original base code). In various embodiments, the subsequent aggregation, as stated and implied, can grant each individual user 102*a* and/or 102*b* access to second, third, etc. additional features, with respect to the other applications 115 and/or access application 116, and where the original aggregated code granted access to an earlier set of features, e.g. first, set of features with respect to the other applications 115 and/or access application 116.

In various embodiments, whether a bit-generation scheme and/or an overlaying scheme is used, the aggregation of one or more barcodes can be with respect to a leveled scheme. For example, a first user, e.g. 102*a*, can be associated with a first level of access with respect to access application 116 and/or other applications 115, e.g. one or more tasks of a first-level related to a group of one or more users. For example, the first user 102*a* can be a contractor associated with a work-task of an organization, and where the individual barcode 103*a* of the first user 102*a*, when aggregated with a common base code 103*c* of the group, and decrypted utilizing any suitable technique as described herein, grants access to a first level of information. The first individual barcode 103*a* can include a first set of bits (e.g. encrypted bits associated with a barcode that can be decrypted using any suitable scheme as discussed herein). A second user, e.g. 102*b*, can be associated with a second-level of access with respect to access application 116 and/or other applications 115, e.g. one or more tasks of a second-level related to a group of one or more users. The second user 102*b* can be a full-time employee of associated with the work-task and the organization, and where the individual barcode 103*b* of the second user 102*b*, when aggregated with a common base code 103*c* of the group, and decrypted utilizing any suitable technique as described herein, grants access to a second level of information. The second individual barcode 103*a* can include a second set of bits (e.g. encrypted bits associated with a barcode that can be decrypted using any suitable scheme as discussed herein), which include the first set of bits and which provide the same first-level of access associated with user 102*a*, but contain additional bits that are associated with the second-level access. Yet another, third, individual (not shown) can be associated with a third-level of access with respect to access application 116 and/or other applications 115, e.g. one or more tasks of a third-level related to a group of one or more users. The third user can be a manager of both the first user 102*a* and the second user 102*b* and can be associated with the work-task and the organization, where the individual barcode (not shown) of the third user, when aggregated with a common base code 103*c* of the group, and decrypted utilizing any suitable technique as described herein, grants access to a second level of information. The third individual barcode can include a second set of bits (e.g. encrypted bits associated with a barcode that can be decrypted using any suitable scheme as discussed herein), which include the first set of bits and the second set of bits and which provide the same first-level of access associated with user 102a and the same second-level access associated with user 102b, but contain additional bits that are associated with the third-level access. In various embodiments, this scheme can conserve dataspace by having common bits amongst various individual code schemes, while also preserving the versatility of a swappable individual code that can be used with a base code that is common to other users with other individual codes.

In various embodiments, the server 120 can include a confirmation mechanism or application 129, e.g. such as a confirmation log, which receives a confirmation from the user device 110 once the user, e.g. 102a, has decrypted any matrix code, including an aggregated barcode 103d. In various embodiments, this enhances security by enabling the host to log activity associated with the matrix codes, including activity related to use of the aggregated codes, which have the group and individual component in relation therewith.

Embodiments are not limited in the above manner, and the above system is merely an exemplary embodiment for implementing one or more features of the present disclosure.

Figure 2:
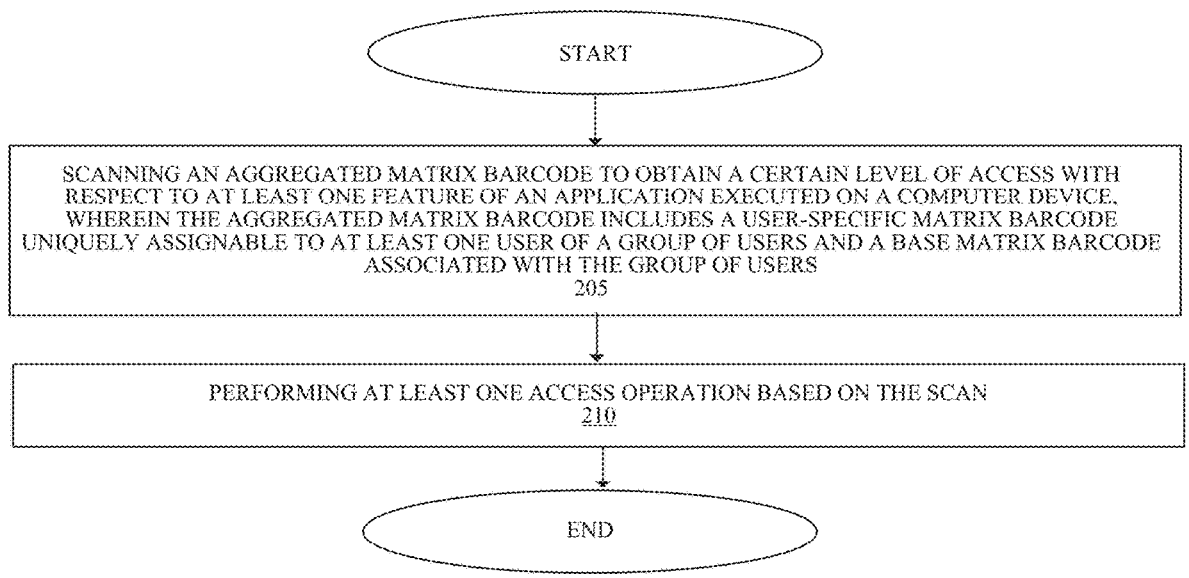
FIG. 2 illustrates an example of one or more processing flows for utilizing and/or scanning a matrix code, e.g. barcode, in accordance with at least one embodiment of the present disclosure.

FIG. 2 illustrates an example of a logic flow 200 that may be representative of some or all of the operations executed by one or more embodiments described herein. For example, the logic flow 200 may illustrate operations performed by a system for generating, transmitting, scanning and/or utilizing one or more matrix codes, e.g. barcodes.

At block 205, one or more embodiments of the logic flow 200 may include at least one component as described in the present disclosure scanning an aggregated matrix code to obtain a certain level of access with respect to at least one feature of an application executed on a computer device. The aggregated matrix barcode can be generated using any suitable component as described herein, and it can include a user-specific matrix code that is unique, e.g. uniquely assignable, to at least one user of a group of users, and a base or group matrix code that is unique to that group, where the aggregated matrix code includes a user-specific matrix code uniquely assignable to at least one user of a group of users and a base matrix code associated with the group of users. In various embodiments, as implied and discussed herein, each user-specific matrix code is distinct from a distinct matrix code, e.g. other user-specific matrix code, assignable to each other user of the group of users, but where the common base or group code can be used by each user and with each individual code to form an aggregated code, e.g. aggregated barcode. wherein the distinct matrix code assignable to every other user of the group of users is combinable with the base matrix code. In various embodiments, the component generating the individual barcode, e.g. one or more applications of a server in coordination with one or more applications of a mobile device, can utilize a leveled scheme with respect to user-specific matrix codes, e.g. barcodes, such that one or more individual barcodes are composed of bits that are a sub-set of other individual barcodes, where each subset defines a level of access, and each additional inclusion of bits per user-specific code can provide an additional level of access, while also remaining distinct from all other user codes.

At block 210, one or more embodiments of the logic flow 200 may include at least one component as described in the present disclosure encrypting, performing at least one access operation based on the scan, e.g. the access operation can be associated with a decryption that includes an aggregated barcode being decrypted by either one or both of an overlaying that forms the aggregated barcode (e.g. overlaying a user-specific barcode over a group or base barcode) and where the decryption results in access with respect to one or more applications hosted by a server and access by one or more components of a mobile device.

Figure 3:
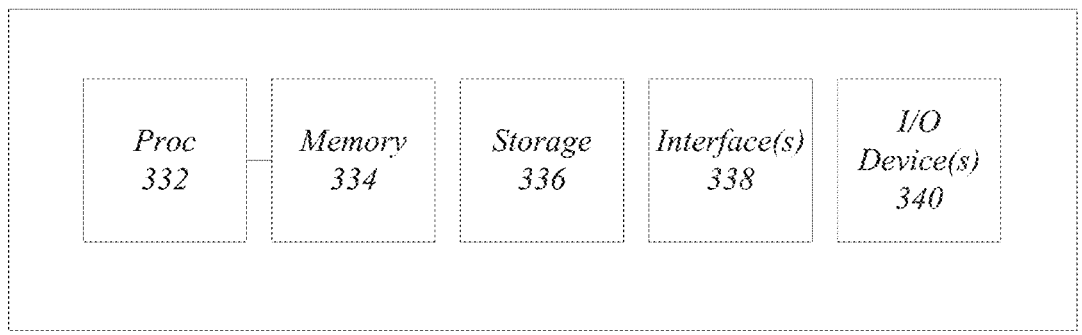
FIG. 3 illustrates a machine learning system according to an embodiment of the present disclosure

FIG. 3 illustrates an example of an encoding, decoding and/or access system 306. The encoding, decoding and/or access system 306 includes one or more processor(s) 332, memory 334, storage 336, one or more interface(s) 338, and one or more I/O device(s) 340.

In embodiments, the encoding, decoding and/or message transmission system 306 may be a processing system that includes one or more servers or computing devices that are interconnected via one or more network links, e.g., wired, wireless, fiber, etc. In some instances, the transaction services system may be a distributed computing system. Each of the servers may include one or more processor(s) 332, which may include one or more processing cores to process information and data. Moreover, the one or more processors 332 can include one or more processing devices, such as a microprocessor manufactured by Intel™, AMD™, or any of various processors. The disclosed embodiments are not limited to any type of processor(s).

Memory 334 can include one or more memory (volatile or non-volatile) devices configured to store instructions used by the one or more processors 332 to perform one or more operations consistent with the disclosed embodiments. For example, memory 334 can be configured with one or more software instructions, such as programs that can perform one or more operations when executed by the one or more processors 332.

The disclosed embodiments are not limited to separate programs or computers configured to perform dedicated tasks. For example, memory 334 can include a single program that performs the operations or could comprise multiple programs. Memory 334 can also store data that can reflect any type of information in any format that the system can use to perform operations consistent with the disclosed embodiments.

In embodiments, the transaction services system 306 may include one or more storage devices 336. The storage devices 336 may include HDDs, flash memory devices, optical storage devices, floppy storage devices, etc. In some instances, the storage devices 336 may include cloud-based storage devices that may be accessed via a network interface. In some embodiments, the storage 336 may be configured to store one or more databases and/or as a distributed database system to store information and data. Databases can include one or more memory devices that store information and are accessed and/or managed through the transaction services system 504. By way of example, databases can include Oracle™ databases, Sybase™ databases, or other relational databases or non-relational databases, such as Hadoop sequence files, HBase, or Cassandra. The databases or other files can include, for example, data and information related to the source and destination of a network request, the data contained in the request, transaction information, etc. Systems and methods of disclosed embodiments, however, are not limited to separate databases. In one aspect, transaction services system 306 can include databases located remotely from other transaction services system 306 devices. The databases can include computing components (e.g., database management system, database server, etc.) configured to receive and process requests for data stored in memory devices of databases and to provide data from databases.

Figure 4:
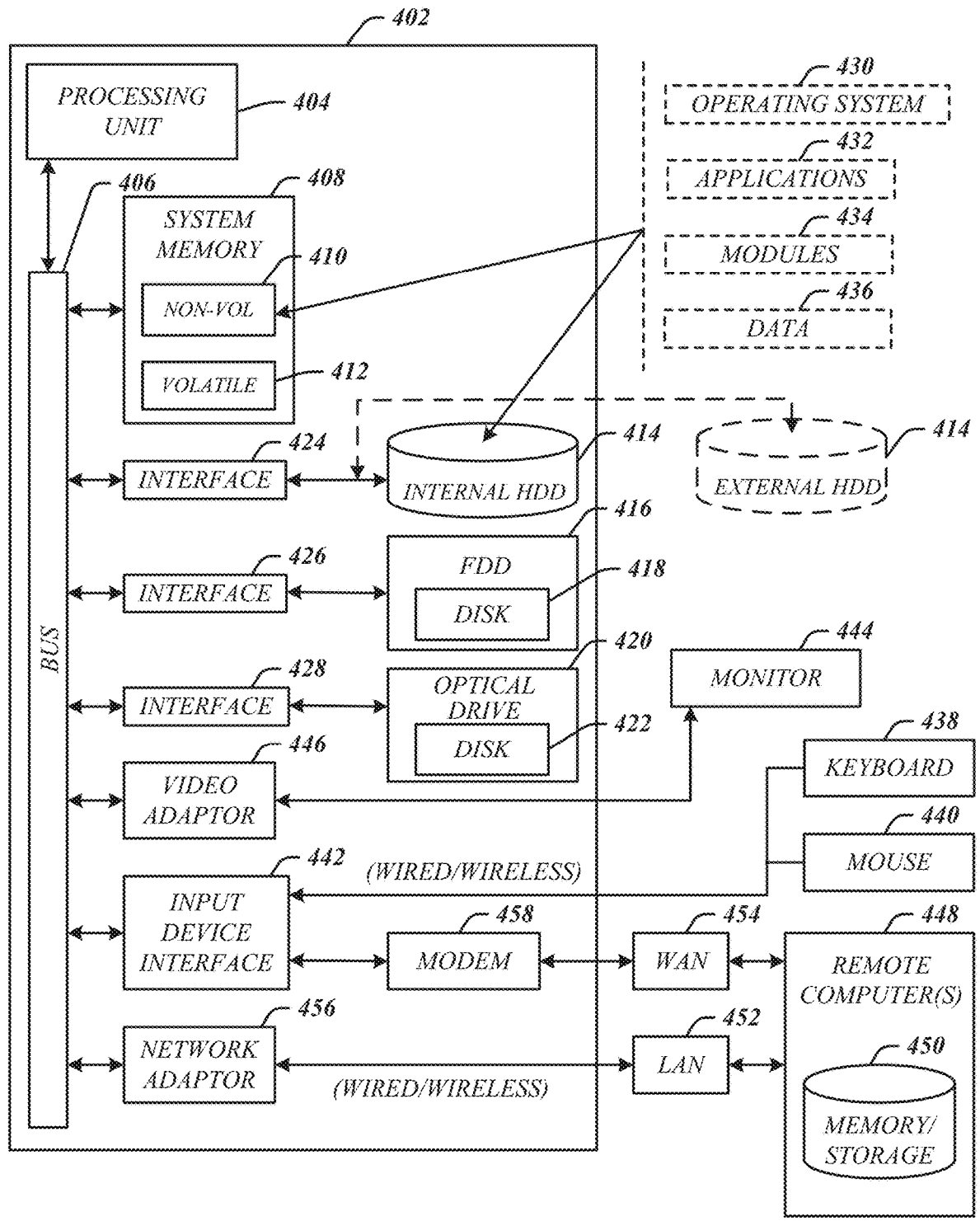
FIG. 4 illustrates an embodiment of a computing architecture useful with at least one embodiment of the present disclosure.

FIG. 4 illustrates an embodiment of an exemplary computing architecture 400 suitable for implementing one or more embodiments as previously described. In one embodiment, the computing architecture 400 may include or be implemented as part of system 100.

As used in this application, the terms "system" and "component" are intended to refer to a computer-related entity, either hardware, a combination of hardware and software, software, or software in execution, examples of which are provided by the exemplary computing architecture 500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 400 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 400.

As shown in FIG. 4, the computing architecture 400 includes a processing unit 404, a system memory 406 and a system bus 408. The processing unit 404 can be any of various commercially available processors.

The system bus 408 provides an interface for system components including, but not limited to, the system memory 406 to the processing unit 404. The system bus 408 can be any of several types of bus structure that may further interconnect to a memory bus (with or without a memory controller), a peripheral bus, and a local bus using any of a variety of commercially available bus architectures. Interface adapters may connect to the system bus 408 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 400 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 406 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 5, the system memory 406 can include non-volatile memory 410 and/or volatile memory 412. A basic input/output system (BIOS) can be stored in the non-volatile memory 410.

The computer 402 may include various types of computer-readable storage media in the form of one or more lower speed memory units, including an internal (or external) hard disk drive (HDD) 414, a magnetic floppy disk drive (FDD) 416 to read from or write to a removable magnetic disk 418, and an optical disk drive 420 to read from or write to a removable optical disk 422 (e.g., a CD-ROM or DVD). The HDD 414, FDD 416 and optical disk drive 420 can be connected to the system bus 408 by an HDD interface 424, an FDD interface 426 and an optical drive interface 428, respectively. The HDD interface 424 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 410, 412, including an operating system 430, one or more application programs 432, other program modules 434, and program data 436. In one embodiment, the one or more application programs 432, other program modules 434, and program data 436 can include, for example, the various applications and/or components of the system 400.

A user can enter commands and information into the computer 402 through one or more wire/wireless input devices, for example, a keyboard 438 and a pointing device, such as a mouse 440. Other input devices may include microphones, infra-red (IR) remote controls, radio-frequency (RF) remote controls, gamepads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 404 through an input device interface 442 that is coupled to the system bus 408 but can be connected by other interfaces such as a parallel port, IEEE 1394 serial port, a game port, a USB port, an IR interface, and so forth.

A monitor 444 or other type of display device is also connected to the system bus 408 via an interface, such as a video adaptor 446. The monitor 444 may be internal or external to the computer 402. In addition to the monitor 444, a computer typically includes other peripheral output devices, such as speakers, printers, and so forth.

The computer 402 may operate in a networked environment using logical connections via wire and/or wireless communications to one or more remote computers, such as a remote computer 448. The remote computer 448 can be a workstation, a server computer, a router, a personal computer, portable computer, microprocessor-based entertainment appliance, a peer device or other common network node, and typically includes many or all the elements described relative to the computer 402, although, for purposes of brevity, only a memory/storage device 450 is illustrated. The logical connections depicted include wire/wireless connectivity to a local area network (LAN) 452 and/or larger networks, for example, a wide area network (WAN) 454. Such LAN and WAN networking environments are commonplace in offices and companies, and facilitate enterprise-wide computer networks, such as intranets, all of which may connect to a global communications network, for example, the Internet.

When used in a LAN networking environment, the computer 402 is connected to the LAN 452 through a wire and/or wireless communication network interface or adaptor 456. The adaptor 456 can facilitate wire and/or wireless communications to the LAN 452, which may also include a wireless access point disposed thereon for communicating with the wireless functionality of the adaptor 456.

When used in a WAN networking environment, the computer 402 can include a modem 458, or is connected to a communications server on the WAN 454 or has other means for establishing communications over the WAN 454, such as by way of the Internet. The modem 458, which can be internal or external and a wire and/or wireless device, connects to the system bus 408 via the input device interface 442. In a networked environment, program modules depicted relative to the computer 402, or portions thereof, can be stored in the remote memory/storage device 450. It will be appreciated that the network connections shown are exemplary and other means of establishing a communications link between the computers can be used.

The computer 402 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-4 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 5:
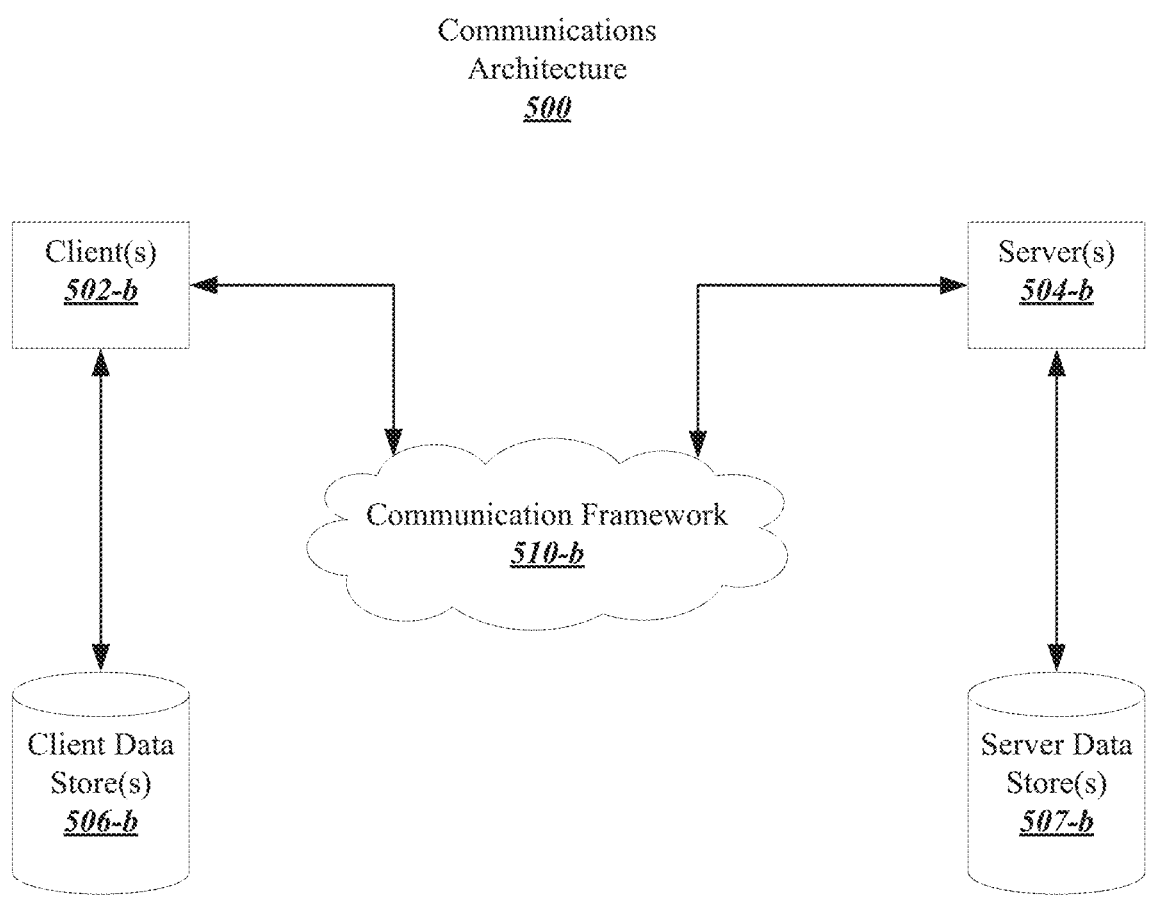
FIG. 5 illustrates an embodiment of a communications architecture useful with at least one embodiment of the present disclosure.

FIG. 5 is a block diagram depicting an exemplary communications architecture 500 suitable for implementing one or more embodiments as previously described. The communications architecture 500 includes various common communications elements, such as a transmitter, receiver, transceiver, radio, network interface, baseband processor, antenna, amplifiers, filters, power supplies, and so forth. The embodiments, however, are not limited to implementation by the communications architecture 500, which may be consistent with system 100.

As shown in FIG. 5, the communications architecture 500 includes one or more clients 502 and servers 504. The servers 504 may implement the server device 306. The clients 502 and the servers 504 are operatively connected to one or more respective client data stores 506 and server data stores 507 that can be employed to store information local to the respective clients 502 and servers 504, such as cookies and/or associated contextual information.

The clients 502 and the servers 504 may communicate information between each other using a communication framework 510. The communications framework 510 may implement any well-known communications techniques and protocols. The communications framework 510 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 510 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 702.7a-x network interfaces, IEEE 702.16 network interfaces, IEEE 702.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 502 and the servers 504. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

One or more embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
 a processor circuit; and
 a memory storing instructions which when executed by the processor circuit, cause the processor circuit to:
  receive, by an application, a first matrix code uniquely assignable to at least one user of a group of users;
  create an aggregated matrix code by overlaying, by the application, the first matrix code on a base matrix code associated with the group of users; and define an encryption key for the aggregated matrix code based on an orientation of the first matrix code relative to the base matrix code in the aggregated matrix code.

2. The apparatus of claim 1, wherein the overlaying of the first matrix code on the base matrix code grants the at least one user access to one or more features associated with the application, wherein the base matrix code is a first layer of the aggregated matrix code, wherein the first matrix code is a second layer of the aggregated matrix code.

3. The apparatus of claim 1, wherein the encryption key for the aggregated matrix code is distinct from an encryption key for the first matrix code and an encryption key for the base matrix code.

4. The apparatus of claim 1, wherein the first matrix code is distinct from a plurality of matrix codes assignable to every other user of the group of users, wherein the plurality of matrix codes are combinable with the base matrix code, the memory storing instructions which when executed by the processor circuit, cause the processor circuit to:
  decrypt the aggregated matrix code using the encryption key.

5. The apparatus of claim 1, wherein the first matrix code is distinct from a second matrix code assignable to a second user of the group of users, wherein the first matrix code comprises a first plurality of bits and is combinable with the base matrix code to grant access to a first feature associated with the application, and wherein the second matrix code includes a second plurality of bits that, when overlaid with the base matrix code, grant access to a second feature associated with the application.

6. The apparatus of claim 1, wherein the aggregated matrix code is to grant the at least one user a first level of access to a first feature associated with the application, and the memory storing instructions which when executed by the processor circuit cause the processor circuit to:
  revoke the first matrix code;
  access, by the application, a second matrix code uniquely assignable to the least one user of a group of users; and
  create an updated aggregated matrix code by overlaying, by the application, the second matrix code to the base matrix code.

7. The apparatus of claim 6, wherein the revocation of the first matrix code restricts the at least one user from accessing the first feature, and wherein the updated aggregated matrix code is useable to either one or both of: i) grant a second level of access, different than the first level of access, to the first feature associated with the application, or ii) grant access to a second feature associated with the application.

8. A non-transitory computer-readable storage medium storing computer-readable program code executable by a processor to cause the processor to:
  receive, by an application, a first matrix code uniquely assignable to at least one user of a group of users;
  create an aggregated matrix code by overlaying, by the application, the first matrix code on a base matrix code associated with the group of users; and
  define an encryption key for the aggregated matrix code based on an orientation of the first matrix code relative to the base matrix code in the aggregated matrix code.

9. The medium of claim 8, wherein the overlaying of the first matrix code on the base matrix code grants the at least one user access to one or more features associated with the application, wherein the base matrix code is a first layer of the aggregated matrix code, wherein the first matrix code is a second layer of the aggregated matrix code.

10. The medium of claim 8, wherein the encryption key for the aggregated matrix code is distinct from an encryption key for the first matrix code and an encryption key for the base matrix code.

11. The medium of claim 8, wherein the first matrix code is distinct from a plurality of matrix codes assignable to every other user of the group of users, wherein the plurality of matrix codes are combinable with the base matrix code, the computer-readable program code executable by the processor to cause the processor to:
  decrypt the aggregated matrix code using the encryption key.

12. The medium of claim 8, wherein the first matrix code is distinct from a second matrix code assignable to a second user of the group of users, wherein the first matrix code comprises a first plurality of bits and is combinable with the base matrix code to grant access to a first feature associated with the application, and wherein the second matrix code includes a second plurality of bits that, when overlaid with the base matrix code, grant access to a second feature associated with the application.

13. The medium of claim 8, wherein the aggregated matrix code is to grant the at least one user a first level of access to a first feature associated with the application, and the computer-readable program code executable by the processor to cause the processor to:
  revoke the first matrix code;
  access, by the application, a second matrix code uniquely assignable to the least one user of a group of users; and
  create an updated aggregated matrix code by overlaying, by the application, the second matrix code to the base matrix code.

14. The medium of claim 13, wherein the revocation of the first matrix code restricts the at least one user from accessing the first feature, and wherein the updated aggregated matrix code is useable to either one or both of: i) grant a second level of access, different than the first level of access, to the first feature associated with the application, or ii) grant access to a second feature associated with the application.

15. A computer-implemented method, comprising:
  receiving, by an application executing on a processor, a first matrix code uniquely assignable to at least one user of a group of users;
  creating an aggregated matrix code by overlaying, by the application, the first matrix code on a base matrix code associated with the group of users; and
  defining an encryption key for the aggregated matrix code based on an orientation of the first matrix code relative to the base matrix code in the aggregated matrix code.

16. The method of claim 15, wherein the overlaying of the first matrix code on the base matrix code grants the at least one user access to one or more features associated with the application, wherein the base matrix code is a first layer of the aggregated matrix code, wherein the first matrix code is a second layer of the aggregated matrix code.

17. The method of claim 15, wherein the encryption key for the aggregated matrix code is distinct from an encryption key for the first matrix code and an encryption key for the base matrix code.

18. The method of claim 15, wherein the first matrix code is distinct from a plurality of matrix codes assignable to every other user of the group of users, wherein the plurality of matrix codes are combinable with the base matrix code, the method further comprising:
  decrypting the aggregated matrix code using the encryption key.

19. The method of claim 15, wherein the first matrix code is distinct from a second matrix code assignable to a second user of the group of users, wherein the first matrix code comprises a first plurality of bits and is combinable with the base matrix code to grant access to a first feature associated with the application, and wherein the second matrix code includes a second plurality of bits that, when overlaid with the base matrix code, grant access to a second feature associated with the application, the method further comprising:

displaying the aggregated matrix code on a display.

20. The method of claim 15, wherein the aggregated matrix code is to grant the at least one user a first level of access to a first feature associated with the application, the method further comprising:

revoking the first matrix code;

accessing, by the application, a second matrix code uniquely assignable to the least one user of a group of users; and creating an updated aggregated matrix code by overlaying, by the application, the second matrix code to the base matrix code.

\* \* \* \* \*